(12) United States Patent
Unterforsthuber

(10) Patent No.: US 7,835,842 B2
(45) Date of Patent: Nov. 16, 2010

(54) MOTOR VEHICLE HAVING A HYBRID DRIVE

(75) Inventor: Jakob Unterforsthuber, Maisach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 916 days.

(21) Appl. No.: 11/717,688

(22) Filed: Mar. 14, 2007

(65) Prior Publication Data

US 2007/0219697 A1 Sep. 20, 2007

(30) Foreign Application Priority Data

Mar. 18, 2006 (DE) ................. 10 2006 012 515

(51) Int. Cl.
*B60Q 1/00* (2006.01)
(52) U.S. Cl. ............... 701/54; 701/99; 340/441; 903/904; 180/65.285
(58) Field of Classification Search .......... None
See application file for complete search history.

(56) References Cited

U.S. PATENT DOCUMENTS

| 5,627,752 | A | 5/1997 | Buck et al. |
| 6,751,534 | B2 * | 6/2004 | Robichaux et al. ............ 701/22 |
| 7,699,129 | B2 * | 4/2010 | Treharne et al. ....... 180/65.265 |
| 2003/0102673 | A1 * | 6/2003 | Nada ........................ 290/40 C |
| 2003/0183431 | A1 | 10/2003 | Cikanek et al. |
| 2006/0231074 | A1 * | 10/2006 | Ueno et al. ................. 123/399 |
| 2007/0219697 | A1 * | 9/2007 | Unterforsthuber ........... 701/51 |
| 2007/0276582 | A1 * | 11/2007 | Coughlin ................... 701/123 |
| 2008/0042489 | A1 * | 2/2008 | Lewis et al. ................. 303/152 |
| 2009/0069155 | A1 * | 3/2009 | Dickinson ................... 477/133 |
| 2009/0112382 | A1 * | 4/2009 | Treharne et al. ............. 701/22 |
| 2009/0281701 | A1 * | 11/2009 | Kargman ..................... 701/70 |
| 2010/0030458 | A1 * | 2/2010 | Coughlin ................... 701/123 |

FOREIGN PATENT DOCUMENTS

| DE | 43 44 369 A1 | 7/1995 |
| DE | 197 43 958 A1 | 4/1999 |
| DE | 298 24 319 U1 | 7/2001 |
| DE | 10 314 396 A1 | 2/2004 |
| DE | 103 14 396 A1 | 2/2004 |

OTHER PUBLICATIONS

"Tausendsassa" ("An Allround Winner"), Auto Motor and Sport, Edition Nov. 2004, pp. 62-64, www.auto-motor-und-sport.de.
German Search Report dated Nov. 3, 2006 w/English translation of pertinent portion (Nine (9) pages).

* cited by examiner

*Primary Examiner*—Khoi Tran
*Assistant Examiner*—Brian J Broadhead
(74) *Attorney, Agent, or Firm*—Crowell & Moring LLP

(57) ABSTRACT

A motor vehicle includes two drive units for generating driving torque, the driving units being operable jointly as well as individually for generating driving torque. A device is provided for defining a driver's intention, and a control unit is provided for processing the driver's intention and for generating a control signal for controlling the drive units. The device for defining the driver's intention is constructed such that a force stage with an increased restoring force exists within the adjusting range of the device. The control unit is constructed such that, starting out from a driving operation in which only one driving device for generating a positive driving torque is active, when the force stage is exceeded, a change-over from one to the other drive unit, or a connection of the other drive unit, takes place.

15 Claims, 1 Drawing Sheet

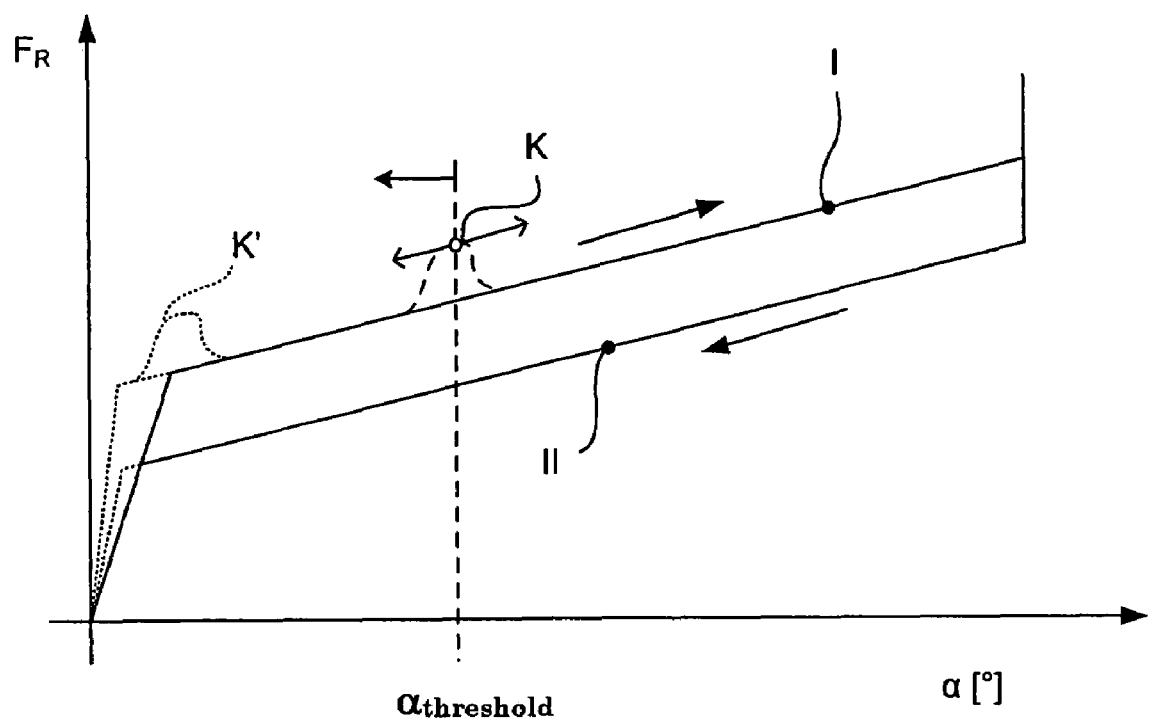

MOTOR VEHICLE HAVING A HYBRID DRIVE

BACKGROUND AND SUMMARY OF THE INVENTION

This application claims the priority of German Application No. 10 2006 012 515.0, filed Mar. 18, 2006, the disclosure of which is expressly incorporated by reference herein.

The invention relates to a motor vehicle and, more particularly, to a motor vehicle having a hybrid drive.

Motor vehicles which have at least two different drive units for generating the driving torque are generally known. A hybrid vehicle in the from of a BMW X5, having an internal-combustion engine and an electrical machine for generating driving torque, is described in the article "Tausendsassa" ("An Allround Winner") of the trade journal *Auto Motor und Sport*, Edition 11/2004, Page 62, et. seq. Another hybrid vehicle with an internal-combustion engine and an electrical machine is known in the form of the Toyota Prius.

Hybrid vehicles can normally drive purely electrically over a certain driving distance or for a certain driving time. The time duration and speed or acceleration depend on the existing electrical power (in the form of the type of electrical machine used and its energy accumulator) and the charge condition of the energy accumulator supplying the electrical machine. When an energy accumulator is fully charged, a higher speed or a greater acceleration can be achieved by way of the electrical machine than in a partially empty charge condition. The operation of the internal-combustion engine has to be started before the energy accumulator is completely depleted, in order to continue to ensure a sufficient driving torque.

In the case of these known systems, as a rule, the driver is informed of the charge condition of the energy accumulator by way of a visual signal indication in the form of a colored luminous bar. However, this information is relatively inexact, so that the driver does not know exactly when to expect a corresponding loss of torque of the electrical machine and, therefore, when a transition to the internal-combustion operation or to a mixed operation takes place.

It is a disadvantage of such systems that, even in situations in which the driver would like to avoid an internal-combustion engine operation, for example, when maneuvering in an underground garage or in so-called stop-and-go traffic, he cannot reliably avoid it. Furthermore, situations are contemplated in which the driver, feeling the need to ensure safe driving, would like to start the operation of the internal-combustion engine purely as a precaution, for example, in the event that a considerable acceleration is immediately imminent, but in which situation this can also not be reliably ensured.

It is an object of the invention to eliminate the above-described disadvantages and provide a motor vehicle in which a considerably improved operability is ensured.

According to the invention, this object is achieved by a motor vehicle including two drive units for generating driving torque, the drive units being operable jointly as well as individually and separately for generating the driving torque, a device for defining a driver's intention, constructed as a twist grip throttle control acted upon by a restoring force or as an accelerator pedal acted upon by a restoring force, and a control unit for processing the driver's intention and for generating a control signal for controlling the drive units. The device for defining the driver's intention is constructed such that a force stage with an increased restoring force exists within the adjusting range of the device. The control unit is constructed such that, starting out from a driving operation in which only one driving device is active for generating a positive driving torque, when the force stage is exceeded, a switch-over from one driving device to the other, or a connection of the other driving device, takes place. Preferred further developments of the invention are also described and claimed herein.

According to the invention, a motor vehicle has at least two drive units for generating torque. One of the drive units is preferably constructed as an internal-combustion engine and the other drive unit is constructed as an electrical machine. The generating and providing of the driving torque in the transmission line can take place jointly by the two driving machines in that both machines generate driving torque and the latter is transmitted in a summed manner, for example, to a drive shaft—but it is also possible that (depending on the operating mode) drive torque is generated or provided either by one or the other of the drive units (thus either by the internal-combustion engine or by the electrical machine). Such arrangements are known, for example, as parallel hybrids. In a known manner, for example, by way of the deflection of an accelerator pedal, a driver's intention (driver's intention moment) is defined, and the latter is transmitted, for example, in the form of an electric signal, as an input signal to the control unit. The defined driver's intention is processed by the control unit and is transmitted in the form of one or more control variable(s) to the respective drive unit.

In the case of an internal-combustion engine, the control variables of the control unit control, for example, a throttle valve for controlling the air supply, an injection system for controlling the fuel feed, and/or an ignition system for controlling the ignition timing of the air-fuel mixture fed to the combustion chambers of the internal-combustion engine. In the case of an electrical driving machine, an electrical control variable for presetting a driving torque is transmitted to this electrical driving machine. According to the invention, the device for defining the driver's intention is constructed such that a force stage with an increased restoring force exists or can be generated. Furthermore, according to the invention, the control unit is constructed such that, starting from a driving operation in which only one of the driving devices for generating a positive torque is active, a switch-over from one driving device to the other, or a connection of the other driving device, takes place when the force stage is exceeded. The driver is thereby permitted to carry out a change-over between the drive units in a targeted manner.

The device for defining the driver's intention is preferably implemented by a so-called force feedback pedal. This type of accelerator pedal makes it possible to impress a force stage into the characteristic accelerator curve (which images the accelerator restoring force over the accelerator pedal travel or the accelerator pedal angle). The position of the force stage can be freely adjusted along the entire adjusting range of the accelerator pedal (entire accelerator pedal travel). The form (force intensity, travel range which the force stage is to cover, etc. . . . ) of the force stage may also be selected or adjusted arbitrarily. For a preferred case, in which the motor vehicle is constructed as a hybrid vehicle with an internal-combustion engine and an electrical driving machine, as a result of the force stage, the transition from the electrical machine to the internal-combustion engine operation or vice-versa can be intentionally initiated by the driver. Furthermore, starting from a deactivated operation (stopped motor) of the driving machines, for example, during a motor-stop-start operation, a starting of one or both drive units can be initiated.

In a preferred embodiment of the invention, beginning with a purely electrical driving operation, the force stage is used for connecting the internal-combustion engine when the force stage is exceeded, or switching-over to a pure internal-combustion engine operation. As an alternative or in addition, it is provided to, out of a stopped phase, during a motor stop-start operation of the motor vehicle, start the internal-combustion engine when the force stage is exceeded.

In a particularly preferred embodiment of the invention, the device for defining the driver's intention and/or the control unit coupled therewith are constructed such that the force stage can be arbitrarily positioned at different points within the adjusting range (for example, the accelerator pedal travel) of the device. This positioning preferably takes place as a function of the load condition of the energy accumulator supplying the electrical machine. As the energy accumulator discharged, the force stage is displaced in the direction of smaller accelerator pedal angles and vice-versa. This means that, when the energy accumulator is very full, the force stage is reached only at very large accelerator pedal angles (the accelerator pedal is very depressed) and, the more depleted the energy accumulator, the earlier (that is, at smaller accelerator pedal angles) the force stage is reached (as the energy accumulator becomes more depleted, the force stage is continuously more depressed in the direction of the accelerator rest position). As a result of the further development according to the invention, a driver is immediately capable of estimating whether or not it is worthwhile to continue to drive only electrically.

As an alternative or in addition, when the vehicle is stationary, especially during a motor stop-start operation, in case there is an automatic motor stop, the force stage is placed at the point at which the internal-combustion engine would start if the starting of the vehicle took place in the first gear position. This corresponds to a point with a very small accelerator pedal angle—this angle corresponding approximately to that angle which is defined in the case of the conventional automatic engine start for starting the internal-combustion engine. The accelerator pedal angle (total swiveling range) in the case of a conventional motor vehicle (passenger car) amounts to approximately 16 angular degrees. Here, only approximately 8 to 10 angular degrees of this total angle or entire swiveling range are utilized for the actual operation, while the remaining range no longer has an effect during an operation. On this basis, the automatic motor start should take place at approximately 10 to 20% of the overall operating path—in the case of a passenger car, therefore at the latest at a deflection of 2 angular degrees. Beginning from an automatic motor stop, when the force stage is reached, preferably the internal-combustion engine is started in order to reliably ensure a certain minimum driving torque.

The system is advantageously constructed such that, in the stationary position (for example, a motor stop) without an engaged gear position, the driver can start the operation of the internal-combustion engine when the clutch is operated (depressed) by bridging the force stage. As a result, a lead with respect to time is ensured, because otherwise the system first has to recognize the power demand from the electrical starting operation and has to start the operation of the internal-combustion engine during the acceleration operation. The obtained time lead represents a considerable gain with respect to safety. An unintentional starting of the operation of the internal-combustion engine is reliably prevented by the force stage.

Generally, in addition to the combination of the internal-combustion engine and the electrical machine, arbitrary other combinations of drive units are also contemplated, in which the idea according to the present invention may be implemented.

Other objects, advantages and novel features of the present invention will become apparent from the following detailed description of the invention when considered in conjunction with the accompanying drawings.

BRIEF DESCRIPTION OF THE DRAWING

The single FIGURE is a schematic illustration of the course of the restoring force $F_R$ over the accelerator pedal angle $\alpha$ in the case of a so-called force feedback pedal.

DETAILED DESCRIPTION OF THE DRAWING

Referring to the FIGURE, the characteristic curve of the restoring force $F_R$ over the accelerator pedal angle $\alpha$ in the case of a so-called force feedback pedal has the shape of a hysteresis, the upper characteristic curve section I illustrating the course of the force (with an increased restoring force) for the deflection in the direction of larger accelerator pedal angles, and the lower characteristic curve section II illustrating the course of the force (with a reduced restoring force while the pedal angle is the same in each case) for a return of the accelerator pedal in the direction of smaller accelerator pedal angles. In this case, the characteristic curve is constructed (for example, adjusted by use of software in a program-related manner) such that a force stage K is impressed in a predetermined (and preferably changeable) accelerator pedal angle $\alpha_{threshold}$. In an accelerator pedal angle range below this force stage K, the motor vehicle is driven, for example, only by the drive unit constructed as an electrical machine, while above this force stage, a drive takes place by way of the drive unit constructed as an internal-combustion engine alone, or jointly by use of both drive units. The arrows on both sides of the force stage have the purpose of illustrating that the force stage K may be positioned arbitrarily on the characteristic curve between small and large accelerator pedal angles—preferably, as described, as a function of the charge condition of the energy accumulator of the electrical machine.

The dotted line indicates a second force stage K' in the starting range of the accelerator pedal angle. Starting out from a stationary vehicle, the internal-combustion engine necessarily is to be started when this force stage K' is exceeded.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   two drive units for generating a driving torque for the motor vehicle, the two drive units being operable both jointly and separately for generating the driving torque;
   a driver's intention input device operably configured to be acted upon by a restoring force;
   a control unit for processing a driver's intention signal from the driver's intention input device and for generating a control signal for controlling the two drive units;
   wherein the driver's intention input device is operably configured such that a force stage having an increased restoring force exists within an adjusting range of the input device; and
   wherein the control unit is operably configured such that, starting from a drive operation in which only one of the two drive units is active for generating a positive driving torque, when the force stage is exceeded, a switch-over from the one drive unit to the other drive unit, or a coupling-in of the other drive unit, occurs.

2. The motor vehicle according to claim 1, wherein one of the two drive units is as an internal-combustion engine and the other is an electrical machine.

3. The motor vehicle according to claim 2, wherein the control unit is operably configured such that, starting out from only an electrical driving operation, the internal-combustion engine is connected or a change-over to only an internal-combustion engine operation takes place when the force stage is exceeded.

4. The motor vehicle according to claim 3, wherein the input device is operably configured such that the force stage is positionable at different adjusting path points within the adjusting range of the input device.

5. The motor vehicle according to claim 4, wherein at least one of the input device and the control unit are operably configured such that the position of the force stage is changeable automatically as a function of a charge condition of an energy accumulating device supplying the electrical machine.

6. The motor vehicle according to claim 3, wherein at least one of the input device and the control unit are operably configured such that, when the motor vehicle is stationary, the force stage is placed in an adjusting path position in which at least one of the drive units would be started in the case of an automatic motor start, and when a force stage positioned in this manner is exceeded, the internal-combustion engine is started automatically.

7. The motor vehicle according to claim 2, wherein the input device is operably configured such that the force stage is positionable at different adjusting path points within the adjusting range of the input device.

8. The motor vehicle according to claim 7, wherein at least one of the input device and the control unit are operably configured such that the position of the force stage is changeable automatically as a function of a charge condition of an energy accumulating device supplying the electrical machine.

9. The motor vehicle according to claim 8, wherein at least one of the input device and the control unit are operably configured such that, when the motor vehicle is stationary, the force stage is placed in an adjusting path position in which at least one of the drive units would be started in the case of an automatic motor start, and when a force stage positioned in this manner is exceeded, the internal-combustion engine is started automatically.

10. The motor vehicle according to claim 7, wherein at least one of the input device and the control unit are operably configured such that, when the motor vehicle is stationary, the force stage is placed in an adjusting path position in which at least one of the drive units would be started in the case of an automatic motor start, and when a force stage positioned in this manner is exceeded, the internal-combustion engine is started automatically.

11. The motor vehicle according to claim 2, wherein at least one of the input device and the control unit are operably configured such that, when the motor vehicle is stationary, the force stage is placed in an adjusting path position in which at least one of the drive units would be started in the case of an automatic motor start, and when a force stage positioned in this manner is exceeded, the internal-combustion engine is started automatically.

12. The motor vehicle according to claim 1, wherein the input device is operably configured such that the force stage is positionable at different adjusting path points within the adjusting range of the input device.

13. A method of controlling two drive units of a motor vehicle, which generate driving torque based on a driver's intention signal communicated via an input device upon which a restoring force acts, the two drive units being operable jointly as well as individually for generating the driving torque, the method comprising the acts of:
defining a force stage in the input device having an increased restoring force existing within an adjusting range of the input device;
starting from a drive operation of the vehicle in which only one drive unit is active for generating the driving torque, switching-over from the one drive unit to the other drive unit, or coupling-in the other drive unit, when the force stage is exceeded.

14. A method of operating a motor vehicle having an internal combustion engine drive unit and an electrical machine drive unit, the electrical machine drive unit having an associated energy accumulator for supplying power to the electrical machine drive unit, the method comprising the acts of:
detecting whether a force stage having an increased restoring force within an adjusting range of a driver's input device has been exceeded; and
upon exceeding the force stage, either switching over a drive operation of the vehicle from only the electrical machine drive unit to the internal combustion engine drive unit or coupling-in the internal combustion engine drive unit with the electrical machine drive unit.

15. The method according to claim 14, further comprising the act of automatically changing a position of the force stage as a function of a charge condition of the energy accumulator of the electrical machine drive unit.

* * * * *